(12) United States Patent
Guetta et al.

(10) Patent No.: US 12,164,493 B1
(45) Date of Patent: Dec. 10, 2024

(54) SEPARATED DATABASE MANAGEMENT

(71) Applicant: Pliops Ltd., Tel Aviv (IL)

(72) Inventors: Guy Guetta, Tel Aviv (IL); Edward Bortnikov, Tel Aviv (IL); Michael Pan, Tel Aviv (IL); Moshe Twitto, Givat Shemuel (IL); Tamar Weiss, Tel Aviv (IL); Shmuel Dashevsky, Ramat gan (IL); Niv Dayan, Tel Aviv (IL)

(73) Assignee: Pliops Ltd., Tel Aviv (IL)

( * ) Notice: Subject to any disclaimer, the term of this patent is extended or adjusted under 35 U.S.C. 154(b) by 127 days.

(21) Appl. No.: 17/651,065

(22) Filed: Feb. 14, 2022

(51) Int. Cl.
*G06F 16/22* (2019.01)
(52) U.S. Cl.
CPC .................. *G06F 16/2246* (2019.01)
(58) Field of Classification Search
CPC .................................. G06F 16/2246
See application file for complete search history.

(56) References Cited

U.S. PATENT DOCUMENTS

| | | | |
|---|---|---|---|
| 2017/0212680 A1* | 7/2017 | Waghulde | G06F 3/0616 |
| 2018/0089244 A1* | 3/2018 | Velayudhan Pillai | G06F 16/23 |
| 2018/0349095 A1* | 12/2018 | Wu | G06F 3/0643 |
| 2019/0065327 A1* | 2/2019 | Wei | G06F 16/2358 |
| 2020/0057782 A1* | 2/2020 | Idreos | G06F 16/2246 |
| 2020/0341956 A1* | 10/2020 | Bayer | G06F 16/219 |
| 2021/0342259 A1* | 11/2021 | Idreos | G06F 16/2272 |
| 2022/0067004 A1* | 3/2022 | Agrawal | G06F 16/2246 |
| 2022/0391377 A1* | 12/2022 | Helland | G06F 16/256 |
| 2023/0237029 A1* | 7/2023 | Tal | G06F 12/08 |
| | | | 707/692 |

* cited by examiner

*Primary Examiner* — Huawen A Peng
(74) *Attorney, Agent, or Firm* — Reches Patents

(57) ABSTRACT

A method for inserting a KV pair to a separated database, the method may include receiving a request to insert the KV pair to the separated database, wherein the separated database comprises a log structured merge (LSM) tree and KV database that is separated from LSM tree; determining whether the KV pair should be associated with a versioned LSM entry or with a non-versions LSM entry; and inserting the KV pair and a KV timestamp in the separated database according to the determining; wherein the inserting includes: storing a combination of the value and the KV timestamp in the KV database; defining an access key to the KV database; wherein the access key is based on the combination when determining that the KV pair should be associated with a versioned LSM; and wherein the access key is based on the key and not on the timestamp when determining that the KV pair should be associated with a non-versioned LSM.

24 Claims, 6 Drawing Sheets

SEPARATED DATABASE MANAGEMENT

BACKGROUND

A key-value (KV) pair is a way to represent data in storage systems. A value of the KV pair may be accessed using the key. The key and the value may be stored together. Alternatively—the keys may be separated from the values in order to reduce I/O amplification. Nevertheless—the separation may increase latency—as require two access operations for the retrieval of the key.

There is a growing need to provide a solution that reduce the I/O amplification and exhibit low latency.

SUMMARY

There may be provided a method for inserting a KV pair to a separated database, the method may include receiving a request to insert the KV pair to the separated database, wherein the separated database may include a log structured merge (LSM) tree and KV database that may be separated from LSM tree; determining whether the KV pair should be associated with a versioned LSM entry or with a non-versions LSM entry; and inserting the KV pair and a KV timestamp in the separated database according to the determining; wherein the inserting includes: storing a combination of the value and the KV timestamp in the KV database; defining an access key to the KV database; wherein the access key may be based on the combination when determining that the KV pair should be associated with a versioned LSM; and wherein the access key may be based on the key and not on the timestamp when determining that the KV pair should be associated with a non-versioned LSM.

There may be provided a non-transitory computer readable medium for inserting a key value (KV) pair to a separated database, the non-transitory computer readable medium stores instructions for: receiving a request to insert the KV pair to the separated database, wherein the separated database may include a log structured merge (LSM) tree and KV database that may be separated from LSM tree; determining whether the KV pair should be associated with a versioned LSM entry or with a non-versions LSM entry; and inserting the KV pair and a KV timestamp in the separated database according to the determining; wherein the inserting may include storing a combination of the value and the KV timestamp in the KV database; defining an access key to the KV database; wherein the access key may be based on the combination when determining that the KV pair should be associated with a versioned LSM; and wherein the access key may be based on the key and not on the timestamp when determining that the KV pair should be associated with a non-versioned LSM.

There may be provided a computerized system may include a memory controller; wherein the memory controller may be configured to: receive a request to insert a key value (KV) pair to a separated database, wherein the separated database may include a log structured merge (LSM) tree and KV database that may be separated from LSM tree; determine whether the KV pair should be associated with a versioned LSM entry or with a non-versions LSM entry; and insert the KV pair and a KV timestamp in the separated database according to the determining; wherein an inserting may include storing a combination of the value and the KV timestamp in the KV database; defining an access key to the KV database; wherein the access key may be based on the combination when determining that the KV pair should be associated with a versioned LSM; and wherein the access key may be based on the key and not on the timestamp when determining that the KV pair should be associated with a non-versioned LSM.

There may be provided a method for inserting a key value (KV) pair to a separated database, the method may include receiving a request to insert the KV pair to the separated database, wherein the separated database may include a log structured merge (LSM) tree and KV database that may be separated from LSM tree; determining whether the KV pair should be associated with a KV pair bloom filter value; inserting the KV pair, a KV timestamp and the KV pair bloom filter value when determining that the KV pair should be associated with the KV pair bloom filter value; and inserting the KV pair and the KV timestamp without inserting the KV pair bloom filter value when determining that the KV pair should not be associated with the KV pair bloom filter value.

There may be provided a' non-transitory computer readable medium for inserting a key value (KV) pair to a separated database, the non-transitory computer readable medium stores instructions for: receiving a request to insert the KV pair to the separated database, wherein the separated database may include a log structured merge (LSM) tree and KV database that may be separated from LSM tree; determining whether the KV pair should be associated with a KV pair bloom filter value; inserting the KV pair, a KV timestamp and the KV pair bloom filter value when determining that the KV pair should be associated with the KV pair bloom filter value; and inserting the KV pair and the KV timestamp without inserting the KV pair bloom filter value when determining that the KV pair should not be associated with the KV pair bloom filter value.

There may be provided a computerized system may include a memory controller; wherein the memory controller may be configured to: receive a request to insert a key value (KV) pair to a separated database, wherein the separated database may include a log structured merge (LSM) tree and KV database that may be separated from LSM tree; determine whether the KV pair should be associated with a KV pair bloom filter value; insert the KV pair, a KV timestamp and the KV pair bloom filter value when determining that the KV pair should be associated with the KV pair bloom filter value; and insert the KV pair and the KV timestamp without inserting the KV pair bloom filter value when determining that the KV pair should not be associated with the KV pair bloom filter value.

There may be provided a method for managing a separated database, the method may include storing multiple values that belong to multiple KV pairs in the separated database; wherein the separated database may include a log structured merge (LSM) tree and KV database that may be separated from LSM tree; wherein one or more KV pairs may be associated with versioned LSM tree entries, and one or more other KV pairs may be associated with non-versioned LSM tree entries; finding that the given versioned LSM tree entry becomes a bottommost visible instance of a given KV pair within the LSM tree; and converting the versioned LSM entry of the KV pair to a non-versioned entry of the KV pair.

There may be provided a non-transitory computer readable medium for managing a separated database, the non-transitory computer readable medium stores instructions for: storing multiple values that belong to multiple KV pairs in the separated database; wherein the separated database may include a log structured merge (LSM) tree and KV database that may be separated from LSM tree; wherein one or more KV pairs may be associated with versioned LSM tree entries, and one or more other KV pairs may be associated with non-versioned LSM tree entries; finding that the given versioned LSM tree entry becomes a bottommost visible instance of a given KV pair within the LSM tree; and converting the versioned LSM entry of the KV pair to a non-versioned entry of the KV pair.

There may be provided a computerized system may include a memory controller; wherein the memory controller may be configured to: storing multiple values that belong to multiple key value (KV) pairs in a separated database; wherein the separated database may include a log structured merge (LSM) tree and KV database that may be separated from LSM tree; wherein one or more KV pairs may be associated with versioned LSM tree entries, and one or more other KV pairs may be associated with non-versioned LSM tree entries; finding that the given versioned LSM tree entry becomes a bottommost visible instance of a given KV pair within the LSM tree; and converting the versioned LSM entry of the KV pair to a non-versioned entry of the KV pair.

There may be provided a method for reading a key value (KV) pair from a separated database, the method may include receiving a request to retrieve a given KV pair from a separated database; wherein the given KV pair may include a given value and a given key; wherein the separated database may include a log structured merge (LSM) tree and KV database that may be separated from LSM tree; wherein at a time of receiving the request, the separated database stores multiple values that belong to multiple KV pairs in the separated database; wherein the; wherein one or more KV pairs may be associated with KV pair bloom filter values and one or more other KV pairs may be not associated with KV bloom filter values; checking whether a given KV pair bloom filter value exists; when the given KV pair bloom filter value does not exist then attempting to retrieve, from the KV database, at least the given value, using an access key that may be based on the given key; when the given KV pair bloom filter value exists then attempting to retrieve the at least given value from the KV database using an access key than may be based on a given combination of the given key and a given KV pair timestamp.

There may be provided a non-transitory computer readable medium for reading a key value (KV) pair from a separated database, the non-transitory computer readable medium stores instructions for: receiving a request to retrieve a given KV pair from a separated database; wherein the given KV pair may include a given value and a given key; wherein the separated database may include a log structured merge (LSM) tree and KV database that may be separated from LSM tree; wherein at a time of receiving the request, the separated database stores multiple values that belong to multiple KV pairs in the separated database; wherein the; wherein one or more KV pairs may be associated with KV pair bloom filter values and one or more other KV pairs may be not associated with KV bloom filter values; checking whether a given KV pair bloom filter value exists; when the given KV pair bloom filter value does not exist then attempting to retrieve, from the KV database, at least the given value, using an access key that may be based on the given key; when the given KV pair bloom filter value exists then attempting to retrieve the at least given value from the KV database using an access key than may be based on a given combination of the given key and a given KV pair timestamp.

There may be provided a computerized system may include a memory controller; wherein the memory controller may be configured to: receive a request to retrieve a given key value (KV) pair from a separated database; wherein the given KV pair may include a given value and a given key; wherein the separated database may include a log structured merge (LSM) tree and KV database that may be separated from LSM tree; wherein at a time of receiving the request, the separated database stores multiple values that belong to multiple KV pairs in the separated database; wherein the; wherein one or more KV pairs may be associated with KV pair bloom filter values and one or more other KV pairs may be not associated with KV bloom filter values; check whether a given KV pair bloom filter value exists; when the given KV pair bloom filter value does not exist then attempting to retrieve, from the KV database, at least the given value, using an access key that may be based on the given key; when the given KV pair bloom filter value exists then attempting to retrieve the at least given value from the KV database using an access key than may be based on a given combination of the given key and a given KV pair timestamp.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
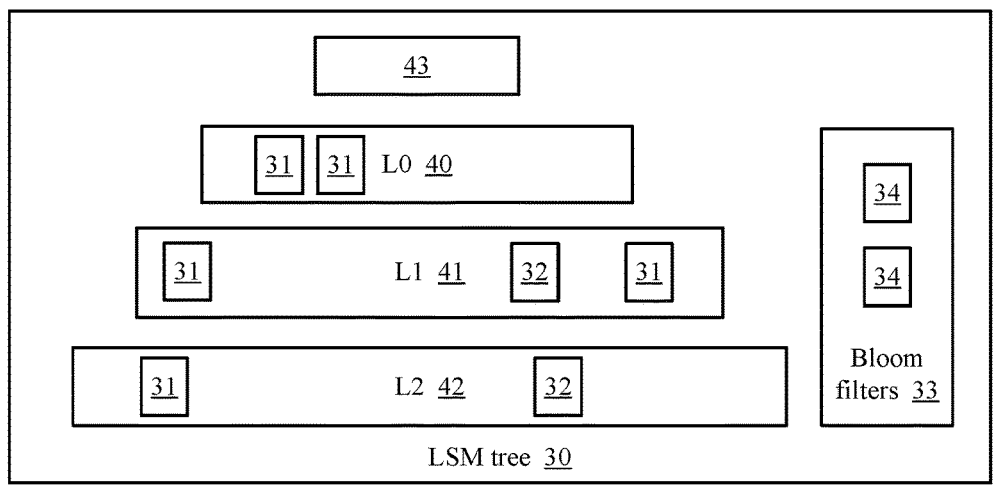
FIG. 1 illustrates an example of a separated database.
Figure 1:
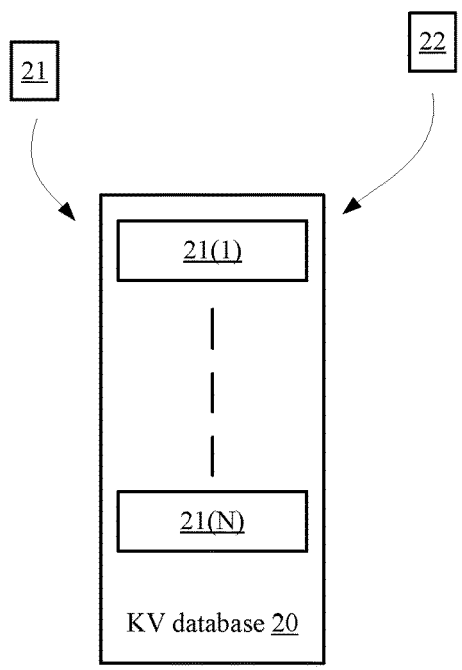

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The specification and/or drawings may refer to a processor and/or a controller. The processor and/or a controller may be or may include one or more processing circuitry. The processing circuitry may be implemented as a a hardware accelerator, as a memory controller, as a SSD memory controller, as a central processing unit (CPU), as a graphic accelerator, and/or one or more other integrated circuits such as application-specific integrated circuits (ASICs), field programmable gate arrays (FPGAs), full-custom integrated circuits, etc., or a combination of such integrated circuits. A system that may execute one or more of the methods and/or one or more steps of one or more methods may be a computerized system that may include one or more processor. For example—the system may be or may include a storage unit (for example—one or more SSD drives and one or more SSD memory controller.

There is provided a separated database that may support storage engine APIs such as (a) random write—put, delete, multiput (put/delete batch), (b) random read—get, multiget, (c) range scan—ordered iteration, and (d) range delete.

The separated database may be optimized for high throughput, low tail latency of (a) random write path—low write amplification (for example—close to 2, including WAL), and (b) random read path (get/multiget)—low read amplification (for example—close to 1).

The separated database may provide best-case performance achieved when the fraction of same-key overwrites updates is small.

The separated database may have (or may be accessed by) batch (multi-* and range-*) API's that are atomic.

The multiget and range scan may provide snapshot semantics, regardless of whether they are invoked via a snapshot or not. In the latter case, the implementation defines a transient snapshot.

The method implements key-value separation, to avoid write amplification upon compaction. In other words, the keys reside in the LSM tree, whereas the values reside in the external KV store. For simplicity of presentation, we assume that all KV pairs are separated, although some KV pairs may be stored in the LSM tree—for example KV pairs having small sized values—for example values having a size less than thresholds—for example—a threshold of 64 bytes).

An LSM entry is a version of some change that happened to the KV pair, with a unique timestamp (KV pair timestamp).

There may be two kinds of entries: a PUT entry (standing either for an insert or for an update) and a DELETE entry (standing for a deletion, also named tombstone).

A KV entry may include a combination of a key (of a KV pair) and a timestamp of its LSM reference (KV pair timestamp).

A read access to the KV entry requires two I/O operations: (a) one to the LSM tree to retrieve the reference, and one more to the KV database. This doubles the get latency. There is a need to have the tail get latency very close to that of the KV.

The suggested method may optimize the get latency for those KV pairs that did not undergo multiple in-place updates.

The method may utilize a special LSM PUT entry type, named a non-versioned entry (of an LSM tree).

A non-versioned LSM tree entry may have two properties: (a) have their lookup in the KV database is by an access key that is based on the key and not on a combination of the key and the KV pair timestamp (<key, timestamp>), and (b) they do not have a KV pair bloom filter value—such value is not stored in a SST file Bloom filters. It should be noted that the non-versioned LSM tree entry may be stored in the LSM tree itself, to support range scans). The LSM tree stores *all* references to externally stored values-both versioned and non-versioned. These references are required for ordered iteration (range query)—which scans the LSM tree and fetches the referenced values one by one, in the order of traversal.

Any reference to an access key to the KV database means an access key for retrieving at least a value of a KV pair.

The method may maintain the invariant that at most one visible non-versioned entry exists for each key. (An entry is called invisible if it cannot be accessed by any get or scan). Reminder—entries become invisible when shadowed by more recent updates to the key).

The combination may be stored in the KV database in a concatenated form.

A timestamp related to a non-versions LSM entry may be used for verification. The verification is required because the access key it the value and does not include the KV pair timestamp. The verification may include checking of the retrieved value complies with any time restriction related to a read request-fir example having a timestamp that does not exceed a snapshot mentioned in the read request.

Get Method (Sketch)

Every visible version in the LSM tree is accessible, in one of two ways: (A)—the LSM tree search (by key) leads to a "normal" versioned entry. The ensuing lookup in the KV database using a combination (<key,timestamp>) based access key. (B)—the LSM tree search fails to find if the key exists via the Bloom filter search. This still leaves room for existence of a non-versioned entry, therefore we must follow up and search in the KV database using an access key that is based on the key and not the combination.

The correctness of this access scheme may depend on the invariant that at most one visible entry per key is non-versioned.

The second search path does not require any I/O to access the LSM tree, assuming that all the Bloom filters are small, and get cached. If most KV pairs have a single version, then most get's entail one I/O, except the false positives, which entail an extra lookup in the LSM tree.

The scan path does not use Bloom filters. It directly de-references each entry in the range (either versioned or non-versioned).

Flush and Compaction Method (Sketch)

The method maintains the "single-visible-non-versioned-entry" property. We choose to maintain the earliest entry in the LSM tree for each key as non-versioned. In the LSM tree structure, this is the bottommost entry (i.e., there are no visible entries at the larger levels).

There may be two conditions to check that the entry is eligible to become a non-versioned reference: (a) there is no active snapshot with a timestamp smaller than the entry's (i.e., that the access to this snapshot might need earlier versions), and (b) the key is not represented in any Bloom filter of the larger (lower) levels.

Note that in the lowest level, there may be multiple versions due to live snapshots.

The flush method may include using the memory buffer (memtable) as a source of all entries. Every PUT entry becomes either versioned or non-versioned. This defines under which access key the object is inserted into KV database. In the first case, it is the combination <key, timestamp>, and the a value that represent the key is added to the new SST file's Bloom filter. In the second case, the access key is based on <key>, and a value representative of the key is not added to the Bloom filter. A bloom filter may be provided per run, per LSM layer and the like. Note that the latter case may entail an overwrite of an object under the same key that stands for a version that is not visible anymore.

The compaction method, which merges multiple SST files, may be similar to flush, except for the case of "renaming" a PUT entry from versioned to non-versioned. When a versioned entry becomes bottommost visible (i.e., the previous bottommost visible entry becomes obsolete), its referenced value is re-inserted into KV database under access key <key>, and the old value is deleted. As before, the key is not added to the generated Bloom filter.

A race condition can emerge when two new SST files are flushed in parallel. In that case, the file that stands for a younger memtable may not use the Bloom filter of the second file, because the latter has not been finalized yet. For that reason, the method disables concurrent flushes into the same LSM tree.

The method may handle a potential race condition between rename (versioned→non-versioned transition) and non-versioned entry deletion, for the same key, in two concurrent compactions.

Environment

FIG. 1 illustrates am example of a separated database 10 that includes a KV database 20 and an LSM tree 30. LSM tree 30 is illustrated as including three levels L0 40, L1 41 and L2 42, and a memory buffer 43. The LSM tree 30 may include two levels or more than three levels.

The KV database 20 may store combinations 21(1)-21(N) of <value, KV pair timestamp>. The KV database 20 may be accessed by access keys—that may include first access keys 21 that are based on the combinations, and second access keys 22 that may be based on the keys and not on the entire combinations.

The LSM tree may include versioned LSM entries 31, non-versioned entries 32 and Bloom filters 33 that may include blook filter KV pair values 34.

Figure 2:
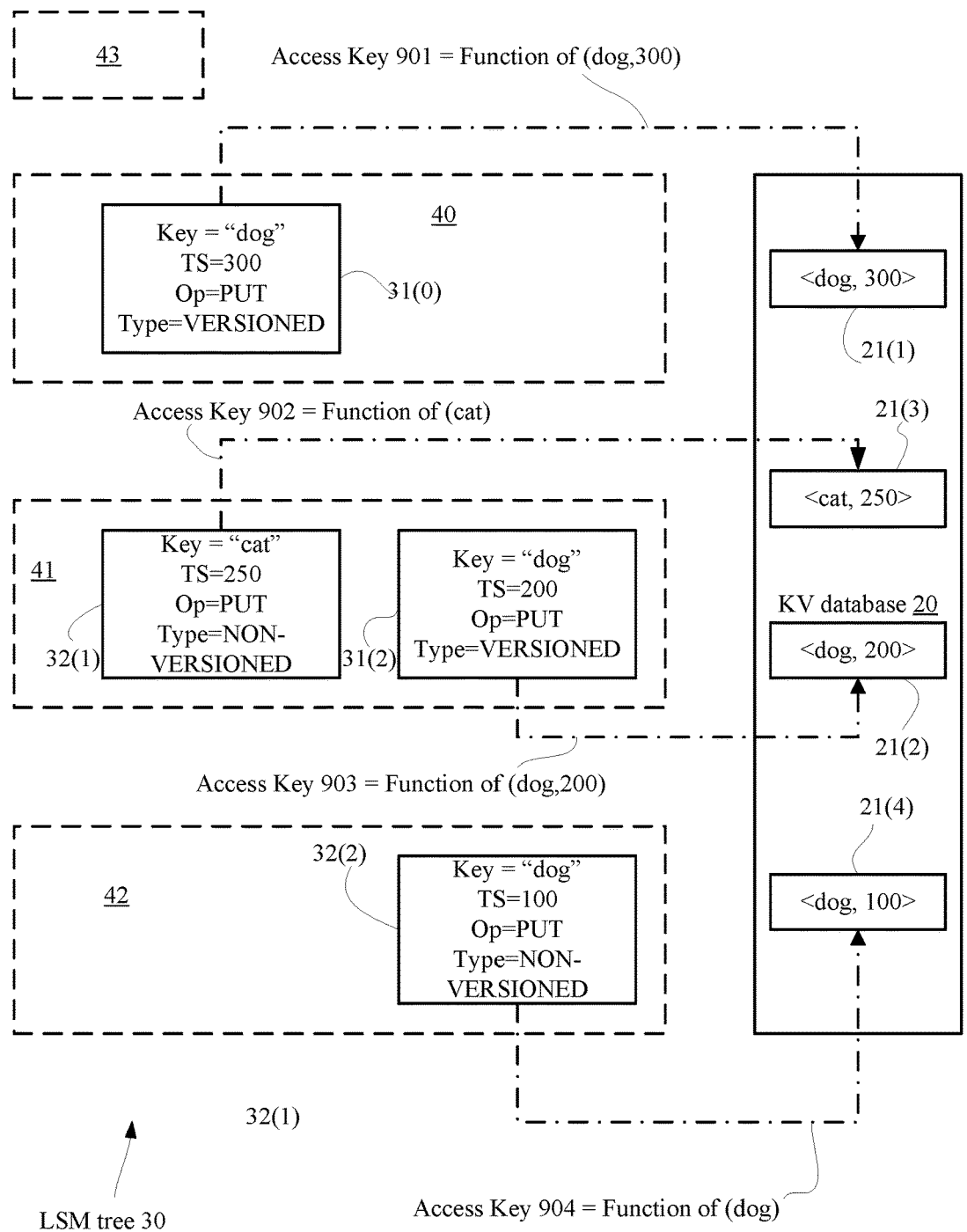
FIG. 2 illustrates an example of a separated database.

FIG. 2 illustrates an example of a separated database 10 in which:

L0 includes a versioned LSM entry 31(0) in which the key is "dog", the KV pair timestamp is 300, and the access type is PUT. The versioned LSM entry 31(0) includes a VERSIONED indicator. The access key 901 to combination 21(1) of <dog,300> within the KV database is based on (dog,300).

L1 includes a versioned LSM entry 31(1) in which the key is "dog", the KV pair timestamp is 200, and the access type is PUT. The versioned LSM entry 31(1) includes a VERSIONED indicator. The access key 902 to combination 21(2) of <dog,200> within the KV database is based on (dog,200).

L1 also includes a non-versioned LSM entry 32(1) in which the key is "cat", the KV pair timestamp is 250, and the access type is PUT. The non-versioned LSM entry 32(1) includes a NON-VERSIONED indicator. The access key 903 to combination 21(3) of <cat,250> within the KV database based on cat.

L2 includes a non-versioned LSM entry 32(2) in which the key is "dog", the KV pair timestamp is 100, and the access type is PUT. The non-versioned LSM entry 32(2) includes a NON-VERSIONED indicator. The access key 904 to the KV database based on dog.

Figure 3:
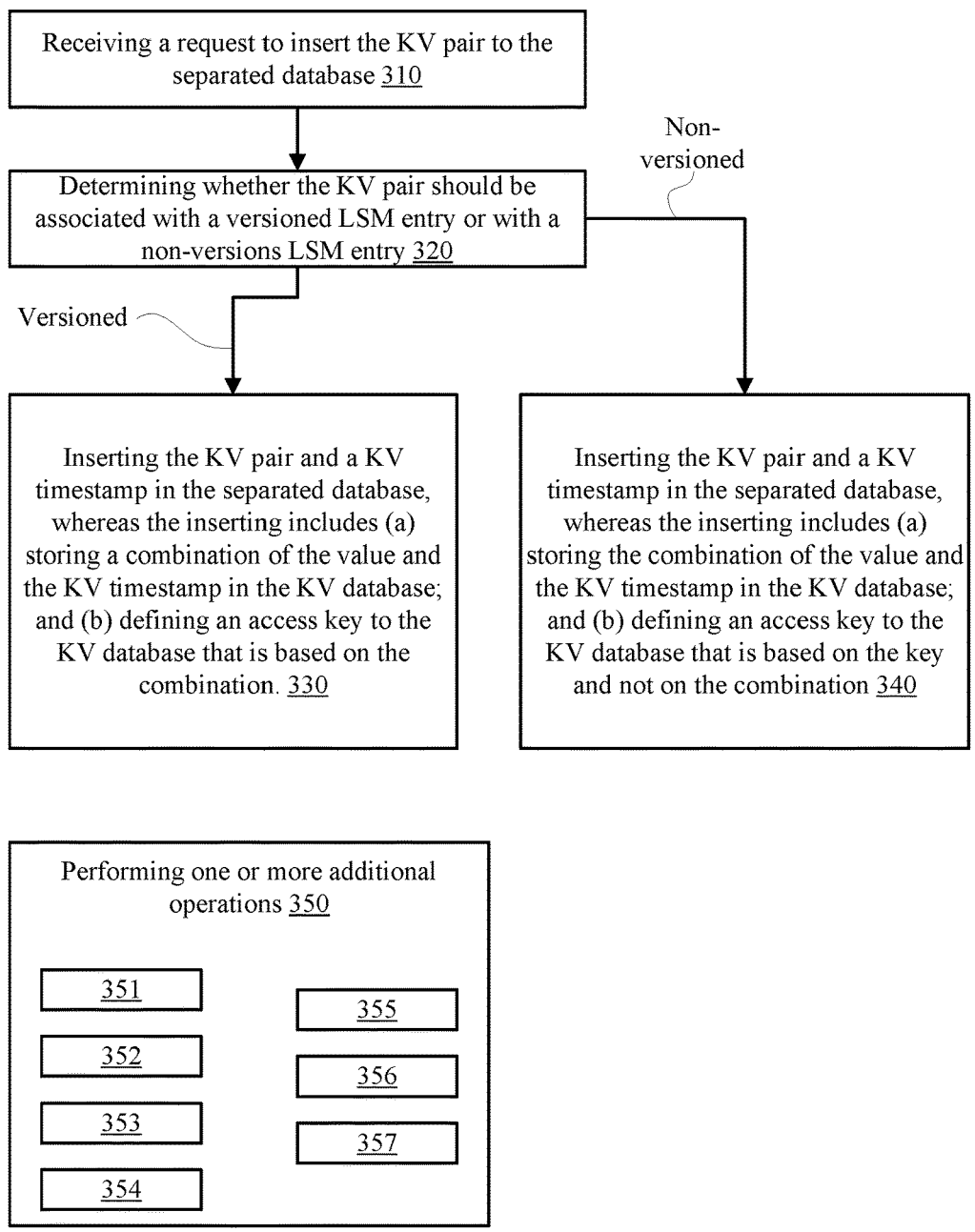
FIG. 3 illustrates an example of a method.

FIG. 3 illustrates method 300 for inserting a key value (KV) pair to a separated database.

Method 300 may start by step 310 of receiving a request to insert the KV pair to the separated database. The request may be a PUT command. The separated database may include a log structured merge (LSM) tree and KV database that is separated from LSM tree.

Step 310 may be followed by step 320 of determining whether the KV pair should be associated with a versioned LSM entry or with a non-versions LSM entry.

Step 320 may include maintaining up to a single visible non-versioned LSM entry for a single KV pair.

Step 320 may include checking whether the separated database currently stores a visible other instance of the KV pair. If the answer is positive-then the KV pair should be associated with a versioned LSM tree entry.

When determining that the KV pair should be associated with a versioned LSM entry then step 320 may be followed of step 330 of inserting the KV pair and a KV timestamp in the separated database, whereas the inserting includes (a) storing a combination of the value and the KV timestamp in the KV database; and (b) defining an access key to the KV database that is based on the combination.

When determining that the KV pair should be associated with a non-versioned LSM entry then step 320 may be followed of step 340 of inserting the KV pair and a KV timestamp in the separated database, whereas the inserting includes (a) storing the combination of the value and the KV timestamp in the KV database; and (b) defining an access key to the KV database that is based on the key and not on the combination.

Step 330 may include adding a KV pair bloom filter value when determining that the KV pair should be associated with the versioned LSM entry then.

Step 340 may include preventing from adding a KV pair bloom filter value when determining that the KV pair should be associated with the non-versioned LSM entry. Step 340 may include preventing from calculating the KV pair bloom filter value.

The LSM tree and bloom filters associated with the LSM tree may be stored in one or more local memory units (for example cached, stored in SSDs), and the KV database may be stored in one or more remote memory units.

Method 300 may include step 350 of performing one or more additional operations. The one or more additional operations may include a memory management operation (for example flushing, compaction) and/or responding to requests such as read requests.

Step 350 may include at least one of the following:

Step 351 of performing a flushing operation.

Step 352 of performing a compaction operation.

Step 353 of converting a versioned LSM entry of the KV pair to a non-versioned entry of the KV pair when the versioned LSM entry becomes a bottommost visible instance of the KV pair within the LSM tree.

Step 354 of performing a compaction operation of the LSM tree while preventing from a deletion of a LSM entry that will become obsolete at a completion of the compaction operation till an end of the compaction operation.

Step 355 of preventing parallel flushes operations from a write buffer of the LSM tree to a non-volatile stored layer of the LSM tree.

Step 356 of receiving a request to retrieve the KV pair from the separated database; checking whether a KV pair bloom filter value exists and when the KV pair bloom filter value does not exist then attempting to retrieve the combination using the access key that is based on the key. The attempting may include accessing the KV database to retrieve a combination. The combination may be verified using the KV pair timestamp of the combination.

Step 357 of receiving a request to retrieve the KV pair from the separated database; checking whether a KV pair bloom filter value exists; and when the KV pair bloom filter value exists then attempting to retrieve the combination from the KV database using the access key that is based on the combination.

Figure 4:
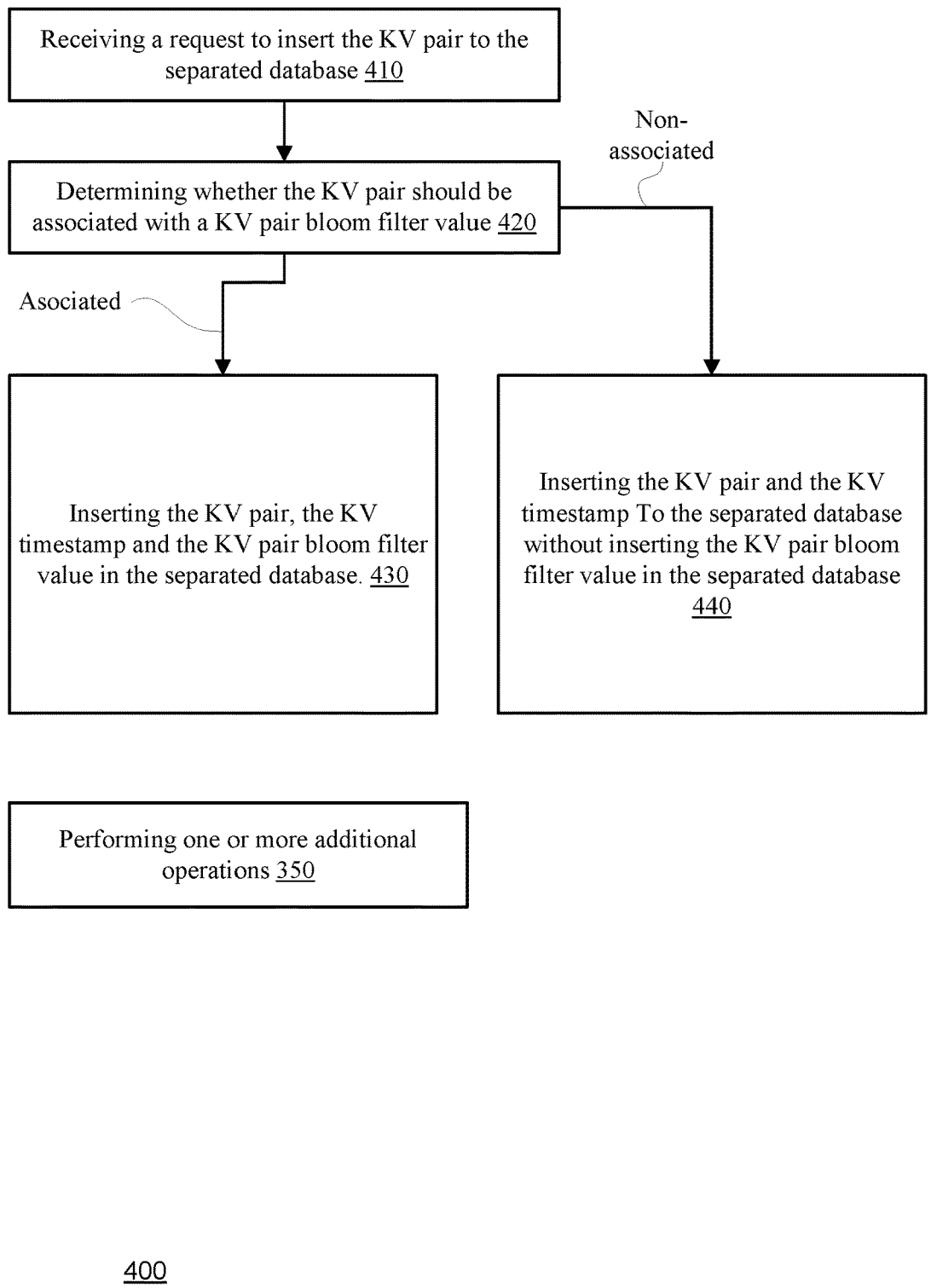
FIG. 4 illustrates an example of a method.

FIG. 4 illustrates method 400 for inserting a key value (KV) pair to a separated database.

Method 400 may start by step 410 of receiving a request to insert the KV pair to the separated database. The request may be a PUT command. The separated database may include a log structured merge (LSM) tree and KV database that is separated from LSM tree.

Step 410 may be followed by step 420 of determining whether the KV pair should be associated with a KV pair bloom filter value.

Step 420 may include determining whether the KV pair should be associated with a versioned LSM entry or with a non-versions LSM entry. Step 420 may include step 320.

When determining that the KV pair should be associated with the KV pair bloom filter value then step 420 may be followed by step 430 of inserting the KV pair, a KV timestamp and the KV pair bloom filter value to the separated database.

Step 430 may include defining an access key to the KV database, wherein the access key is based on the combination.

When determining that the KV pair should not be associated with the KV pair bloom filter value then step 420 may be followed by step 440 of inserting the KV pair and the KV timestamp without inserting the KV pair bloom filter value.

Step 440 may include preventing from calculating the KV pair bloom filter value.

Step 440 may include defining an access key to the KV database, the access key is based on the key and not on the timestamp.

Either one of steps 430 and 440 may include storing the combination of the value and the KV timestamp in the KV database.

The LSM tree and bloom filters associated with the LSM tree may be stored in one or more local memory units (for example cached, stored in SSDs), and the KV database may be stored in one or more remote memory units.

Method 400 may include step 350 of performing one or more additional operations. The one or more additional operations may include a memory management operation (for example flushing, compaction) and/or responding to requests such as read requests.

Figure 5:
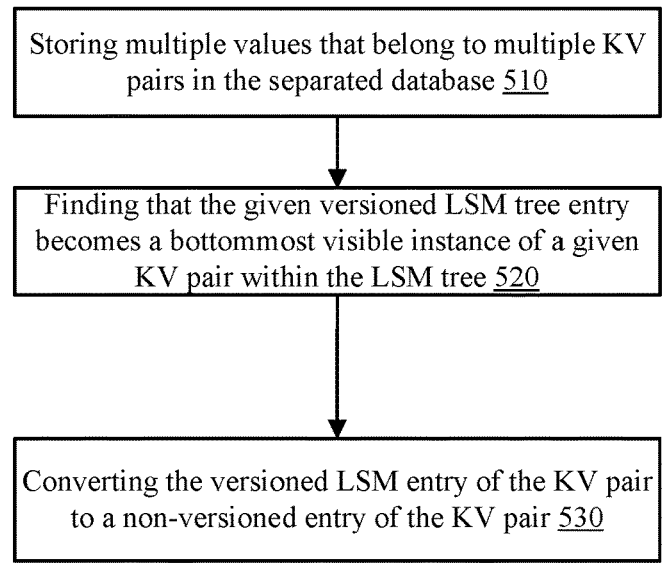
FIG. 5 illustrates an example of a method.

FIG. 5 illustrates method 500 for managing a separated database.

Method 500 may start by step 510 of storing multiple values that belong to multiple KV pairs in the separated database. The separated database may include a log structured merge (LSM) tree and KV database that is separated from LSM tree.

One or more KV pairs may be associated with versioned LSM tree entries.

One or more other KV pairs may be associated with non-versioned LSM tree entries.

A current state of the separated database may provided by responding to access requests, performing various management operations such as but not limited flushing, and compactions.

Step 510 may be followed by step 520 of finding that the given versioned LSM tree entry becomes a bottommost visible instance of a given KV pair within the LSM tree. This may be a result of compaction and a deletion of other visible versions of the given KV pair.

Step 520 may be followed by step 530 of converting the versioned LSM entry of the KV pair to a non-versioned entry of the KV pair. This may include deleting the KV pair bloom filter value that was associated with the versioned LSM entry.

Figure 6:
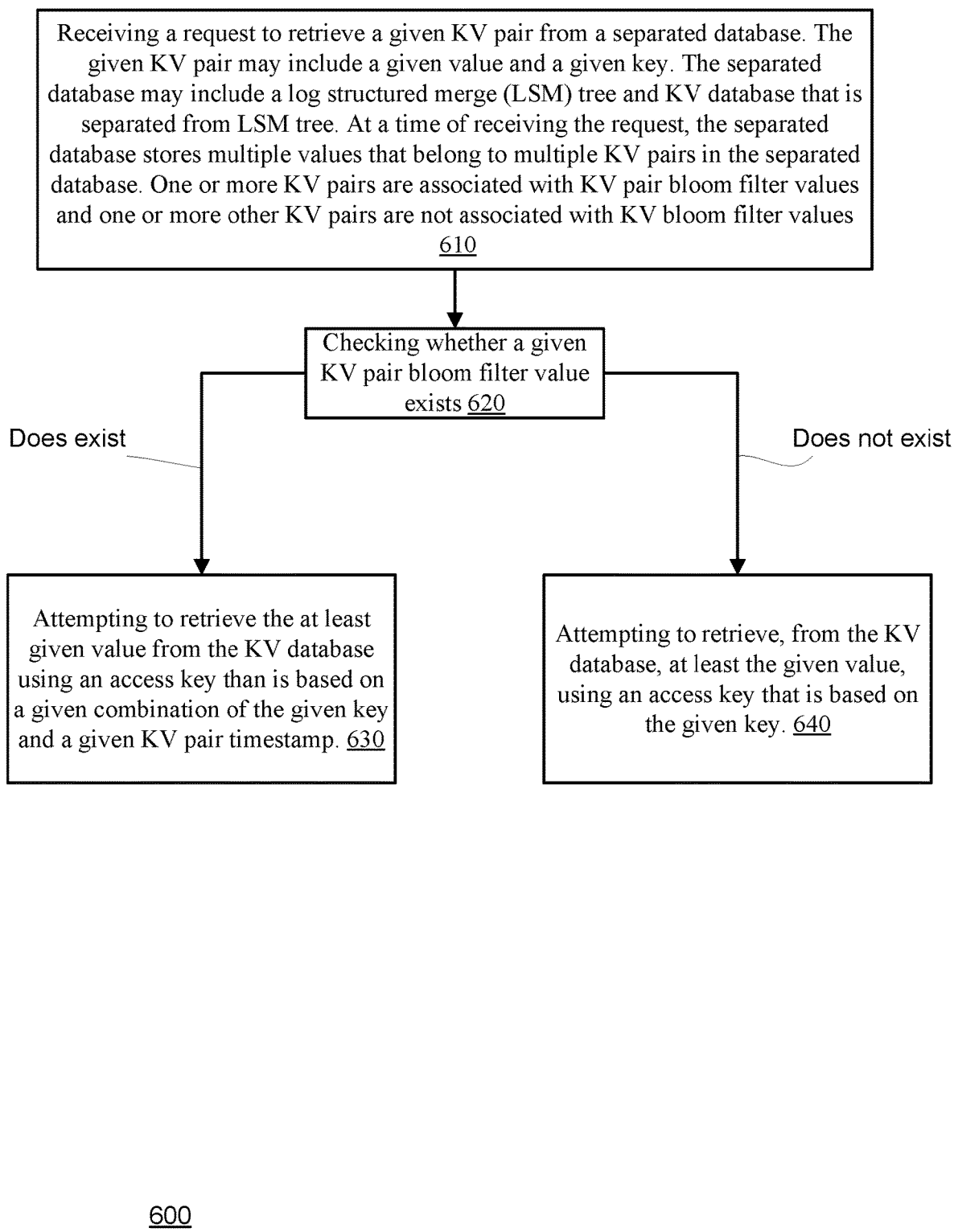
FIG. 6 illustrates an example of a method.

FIG. 6 illustrates method 600 for managing a separated database.

Method 600 may start by step 610 of receiving a request to retrieve a given KV pair from a separated database. The given KV pair may include a given value and a given key. The separated database may include a log structured merge (LSM) tree and KV database that is separated from LSM tree. At a time of receiving the request, the separated database stores multiple values that belong to multiple KV pairs in the separated database. One or more KV pairs are associated with KV pair bloom filter values and one or more other KV pairs are not associated with KV bloom filter values.

Step 610 may be followed by step 620 of checking whether a given KV pair bloom filter value exists.

If the given KV pair bloom filter value exists-step 620 is followed by step 630 of attempting to retrieve the at least given value from the KV database using an access key than is based on a given combination of the given key and a given KV pair timestamp.

If the given KV pair bloom filter value does not exist—step 620 is followed by step 640 of attempting to retrieve, from the KV database, at least the given value, using an access key that is based on the given key.

The following pseudocode provide various example for implementing one or more of the mentioned above methods.

The inventors implemented the method in RocksDB. Other implementations may be provided.

The pseudo code below may be a bit simplified.

A background job (flush/compaction) scheduler provides the following:

For method correctness, intra-flush concurrency is disabled (i.e., memtable flushes do not overlap in time).

To avoid technical complexity, L0→L0 (intra-level) compactions are disabled.

With proper system tuning, these constraints bear no performance penalty.

Flush/Compaction APIs

We assume that both flush and compaction are implemented as iterators that provide callbacks for each row (version) they scan. There are two types of callbacks: one for visible rows (i.e., the rows that some read may see), and one for invisible rows (i.e., the rows that no read can see). The implementation details of these iterators are unrelated to key-value separation. For example, an iterator may buffer multiple rows pertaining to the same key prior to deciding which of them are invisible.

We assume that all versions of each key are iterated through contiguously, in the descending order of timestamps (i.e., last-to-first).

Pseudocode Notation
Row types
//Generic LSM-tree row type, the rest derive from it
Struct Row {key, val, ts}//ts stands for "timestamp"
Struct MemtableRow extends Row {key, val, ts, type}
type ∈ {MT_PUT, MT_DELETE}
Struct SstRow extends Row {key, val, ts, type}
type ∈ {SST_PUT_V, SST_PUT_NV, SST_DELETE}
//External KV table entry
Struct Pair {key, val {ts, data} } val is a concatenation of ts and data
Read path (GET and SCAN)
Public get(key, LSM, KV)
    pair←get_from_snapshot(key, LSM.current_ts, LSM, KV)
    Return pair
Public get_from_snapshot(key, snap_ts, LSM, KV)
    //Fetch the latest version with timestamp<=snap_ts
    //LSM is using its Bloom filters
    row←LSM.get_from_snapshot(key, snap_ts)
    If (row=⊥) Then
        //Not covered by any BF but may still be in KV (NONVERSIONED reference) pair←get_and_verify(key, snap_ts, KV)
    Else
        //No need to verify the timestamp, we know what we are looking for pair←lookup_row(row, KV)
    Endif
    Return pair
//The same lookup_row method is used for processing a row in scan iterator
Private lookup_row(row, KV)
    If (row.type=SST_DELETE) Then
        //Tombstone-either single-row or range delete
        pair←⊥
    ElsIf (row.type=SST_PUT_NV) Then
        pair←KV.get(row.key)//false positive
    Else//type=SST_PUT_V
        pair←KV.get(row.key∘row.ts)
        If (pair=⊥) Then
            //Fallback. Take care of the race condition—
            //a concurrent compaction might have renamed this KV pair pair←get_and_verify(row.key, snap_ts, KV)
        Endif
    Endif
    Return pair
Private get_and_verify(key, snap_ts, KV)
    pair←KV.get(key)
    //Verify the timestamp (embedded in the value)
    If (pair !=⊥ And pair.val.ts>snap_ts) Then//Does not belong to the snapshot pair←⊥
    Endif
    Return pair
Flush
Public flush_iterator_handle_emit(mtRow, LSM, KV, newSST)
    If (mtRow.type=MT_PUT) Then
        If (is_bottommost_visible(mtRow, LSM, 0)) Then
            KV.put(mtRow.key, {mtRow.ts, mtRow.val})
            newSST.append(mtRow.key, ⊥, mtRow.ts, SST_PUT_NV)
        Else
            KV.put(mtRow.key∘mtRow.ts, {⊥, mtRow.val} }
            newSST.append(mtRow.key, ⊥, mtRow.ts, SST_PUT_V)
            newSST.BF.add(mtRow.key)
        Endif
    Else//mtRow.type=MT_DELETE
        newSST.append(mtRow.key, ⊥, mtRow.ts, SST_DELETE)
        newSST.BF.add(mtRow.key)
    Endif
Public flush_iterator_handle_skip(sstRow, LSM, KV, skip_type)
    //Redundant memtable entries are eliminated with no external effect.
Compaction
Public compaction_iterator_handle_emit(sstRow, LSM, KV, newSST)
    If (sstRow.type=SST_PUT_V) Then
        If (is_bottommost_visible(sstRow, LSM, newSST.level+1)) Then
            //Rename (VERSIONED→NONVERSIONED)
            v_key←sstRow.key∘sstRow.ts
            pair←KV.get(v_key)
            If (pair !=⊥) Then
                KV.put(sstRow.key, {sstRow.ts, pair.val.data})
                KV.delete(v_key)
            Else
                //Recovery-no work to do
            Endif
            sstRow.type←SST_PUT_NV
        Else
            newSST.BF.add(sstRow.key)
        Endif
    Elsif (sstRow.type=SST_PUT_NV) Then
        //Not much to do, already there. Just add to SST, no BF
    Else//(sstRow.type=SST_DELETE)
        newSST.BF.add(sstRow.key)
    Endif
    newSST.append(sstRow.key, ⊥, sstRow.ts, sstRow.type)
Public compaction_iterator_handle_skip(sstRow, LSM, KV, skip_type)
    If (sstRow.type=SST_PUT_V) Then
        //Eliminate this entry-no sharing, no one can see it
        KV.delete(sstRow.key∘sstRow.ts)
    Elsif (sstRow.type=SST_PUT_NV) Then
        If (skip_type=SKIP_DELETE) Then
            //The same compaction observed a previous (newer) tombstone.
            //Delete the object, unless already overwritten by a previous compaction
            pair←KV.get(key)//We can prove that get( ) . . . delete( ) is atomic
            If (pair !=⊥ And pair.val.ts=sstRow.ts) Then
                KV.delete(sstRow.key)
            Endif
        Else//skip_type=SKIP_OVERWRITE
            //Optimization—a previous (newer) PUT performed the rename
            //No work to do
        Endif
    Else//(sstRow.type=SST_DELETE)

```
        //Do nothing for tombstones. KV cleanup is handled
            thru PUT rows
    Endif
Service Functions
//Predicate returns true if there are no visible versions of
    this row's key at bigger LSM levels
//Conservative-false negatives are allowed, but false posi-
    tives are not.
Private is_bottommost_visible(row, LSM, min_level)
    If (row.ts>LSM.snapshot_timestamps( ).min( )) Then
        Return False
    Endif
    For 1 in (min_level . . . LSM.max_level( ))
        For SST in LSM.sst_files(l)
            If (SST.BF.contains(row.key)
            //There is an earlier VERSIONED reference to this
                key
            Or
                SST.RangeDeletes.covers(row.key)
                //Range delete is like a tombstone
            ) Then
                Return False
            End
    End
End
//No match found—this key version is the bottommost
    visible
Return True
```

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for inserting a key value (KV) pair to a separated database, the method comprises:
   Receiving a request to insert the KV pair to the separated database, wherein the separated database comprises a log structured merge (LSM) tree and KV database that is separated from LSM tree; wherein at least one layer of the LSM tree is stored in a non-volatile memory;
   determining whether the KV pair should be associated with a versioned LSM entry or with a non-versioned LSM entry; and
   inserting the KV pair and a KV timestamp in the separated database according to the determining;
   wherein the inserting comprises:
      storing a combination of the value and the KV timestamp in the KV database;
      defining an access key to the KV database;
      wherein the access key is based on the combination when determining that the KV pair should be associated with a versioned LSM; and
      wherein the access key is based on the key and not on the timestamp when determining that the KV pair should be associated with a non-versioned LSM.

2. The method according to claim 1 wherein the inserting comprises adding a KV pair bloom filter value when determining that the KV pair should be associated with the versioned LSM entry.

3. The method according to claim 2, wherein the inserting comprises preventing from adding a KV pair bloom filter value when determining that the KV pair should be associated with the non-versioned LSM entry.

4. The method according to claim 1 wherein the determining comprises maintaining up to a single visible non-versioned LSM entry for a single KV pair.

5. The method according to claim 1 comprising determining comprises checking whether the separated database currently stores a visible other instance of the KV pair.

6. The method according to claim 1 wherein the LSM tree and bloom filters associated with the LSM tree are stored in one or more local memory units and the KV database is stored in one or more remote memory units.

7. The method according to claim 1 comprising converting a versioned LSM entry of the KV pair to a non-versioned entry of the KV pair when the versioned LSM entry becomes a bottommost visible instance of the KV pair within the LSM tree.

8. The method according to claim 1 comprising performing a compaction operation of the LSM tree while preventing from a deletion of a LSM entry that will become obsolete at a completion of the compaction operation till an end of the compaction operation.

9. The method according to claim 1 comprising preventing parallel flushes operations from a write buffer of the LSM tree to the layer of the LSM tree that is stored in the non-volatile memory.

10. The method according to claim 1 comprising receiving a request to retrieve the KV pair from the separated database; checking whether a KV pair bloom filter value exists; when the KV pair bloom filter value does not exist then attempting to retrieve the combination using the access key that is based on the key.

11. The method according to claim 1 comprising receiving a request to retrieve the KV pair from the separated database; checking whether a KV pair bloom filter value exists; when the KV pair bloom filter value exists then attempting to retrieve the combination from the KV database using the access key that is based on the combination.

12. The method according to claim 1, comprising using a timestamp associated with the KV pair associated with the non-versioned LSM entry that a retrieved value complies with any time related restriction elated to a read request.

13. A non-transitory computer readable medium for inserting a key value (KV) pair to a separated database, the non-transitory computer readable medium stores instructions for:
receiving a request to insert the KV pair to the separated database, wherein the separated database comprises a log structured merge (LSM) tree and KV database that is separated from LSM tree; wherein at least one layer of the LSM tree is stored in a non-volatile memory;
determining whether the KV pair should be associated with a versioned LSM entry or with a non-versioned LSM entry; and
inserting the KV pair and a KV timestamp in the separated database according to the determining;
wherein the inserting comprises:
storing a combination of the value and the KV timestamp in the KV database;
defining an access key to the KV database;
wherein the access key is based on the combination when determining that the KV pair should be associated with a versioned LSM; and
wherein the access key is based on the key and not on the timestamp when determining that the KV pair should be associated with a non-versioned LSM.

14. The non-transitory computer readable medium according to claim 13 wherein the inserting comprises adding a KV pair bloom filter value when determining that the KV pair should be associated with the versioned LSM entry.

15. The non-transitory computer readable medium according to claim 13, wherein the inserting comprises preventing from adding a KV pair bloom filter value when determining that the KV pair should be associated with the non-versioned LSM entry.

16. The non-transitory computer readable medium according to claim 13 wherein the determining comprises maintaining up to a single visible non-versioned LSM entry for a single KV pair.

17. The non-transitory computer readable medium according to claim 13 that stores instructions for determining comprises checking whether the separated database currently stores a visible other instance of the KV pair.

18. The non-transitory computer readable medium according to claim 13 wherein the LSM tree and bloom filters associated with the LSM tree are stored in one or more local memory units and the KV database is stored in one or more remote memory units.

19. The non-transitory computer readable medium according to claim 13 that stores instructions for converting a versioned LSM entry of the KV pair to a non-versioned entry of the KV pair when the versioned LSM entry becomes a bottommost visible instance of the KV pair within the LSM tree.

20. The non-transitory computer readable medium according to claim 13 that stores instructions for performing a compaction operation of the LSM tree while preventing from a deletion of a LSM entry that will become obsolete at a completion of the compaction operation till an end of the compaction operation.

21. The non-transitory computer readable medium according to claim 13 that stores instructions for preventing parallel flushes operations from a write buffer of the LSM tree to the layer of the LSM tree that is stored in the non-volatile memory.

22. The non-transitory computer readable medium according to claim 13 that stores instructions for receiving a request to retrieve the KV pair from the separated database; checking whether a KV pair bloom filter value exists; when the KV pair bloom filter value does not exist then attempting to retrieve the combination using the access key that is based on the key.

23. The non-transitory computer readable medium according to claim 13 that stores instructions for receiving a request to retrieve the KV pair from the separated database; checking whether a KV pair bloom filter value exists; when the KV pair bloom filter value exists then attempting to retrieve the combination from the KV database using the access key that is based on the combination.

24. A computerized system comprising a memory controller; wherein the memory controller is configured to:
receive a request to insert a key value (KV) pair to a separated database, wherein the separated database comprises a log structured merge (LSM) tree and KV database that is separated from LSM tree; wherein at least one layer of the LSM tree is stored in a non-volatile memory;
determine whether the KV pair should be associated with a versioned LSM entry or with a non-versioned LSM entry; and
insert the KV pair and a KV timestamp in the separated database according to the determining;
wherein an inserting comprises:
storing a combination of the value and the KV timestamp in the KV database;
defining an access key to the KV database;
wherein the access key is based on the combination when determining that the KV pair should be associated with a versioned LSM; and
wherein the access key is based on the key and not on the timestamp when determining that the KV pair should be associated with a non-versioned LSM.

\* \* \* \* \*